United States Patent
Li et al.

(10) Patent No.: US 9,940,141 B2
(45) Date of Patent: Apr. 10, 2018

(54) METHOD AND APPARATUS FOR SELECTING BOOTSTRAP ESIMS

(71) Applicant: Apple Inc., Cupertino, CA (US)

(72) Inventors: Li Li, Los Altos, CA (US); Arun G. Mathias, Sunnyvale, CA (US); Jean-Marc Padova, San Francisco, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 14/872,067

(22) Filed: Sep. 30, 2015

(65) Prior Publication Data

US 2016/0246611 A1     Aug. 25, 2016

Related U.S. Application Data

(60) Provisional application No. 62/119,749, filed on Feb. 23, 2015.

(51) Int. Cl.
| | |
|---|---|
| *G06F 9/44* | (2006.01) |
| *H04L 29/06* | (2006.01) |
| *H04W 4/00* | (2018.01) |
| *H04W 4/02* | (2018.01) |
| *H04W 12/08* | (2009.01) |
| *H04W 8/18* | (2009.01) |
| *G06F 21/78* | (2013.01) |

(52) U.S. Cl.
CPC .......... *G06F 9/4408* (2013.01); *H04L 63/107* (2013.01); *H04W 4/001* (2013.01); *H04W 4/025* (2013.01); *H04W 8/183* (2013.01); *H04W 12/08* (2013.01); *G06F 21/78* (2013.01); *H04L 63/0853* (2013.01)

(58) Field of Classification Search
CPC .. H04L 63/107; H04L 63/0853; H04W 4/001; H04W 4/025; H04W 8/183; H04W 12/08; G06F 21/78
See application file for complete search history.

(56) References Cited

U.S. PATENT DOCUMENTS

| | | | |
|---|---|---|---|
| 8,666,368 B2 | 3/2014 | Schell et al. | |
| 2008/0096559 A1* | 4/2008 | Phillips | H04W 48/18 455/435.2 |
| 2011/0151836 A1* | 6/2011 | Dadu | H04L 63/0853 455/411 |
| 2011/0159843 A1 | 6/2011 | Heath et al. | |
| 2011/0306318 A1 | 12/2011 | Rodgers et al. | |
| 2012/0108206 A1* | 5/2012 | Haggerty | H04W 12/06 455/411 |

(Continued)

*Primary Examiner* — Robert Leung
(74) *Attorney, Agent, or Firm* — Downey Brand LLP

(57) ABSTRACT

Disclosed herein is a technique for selecting a bootstrap electronic Subscriber Identity Module (eSIM) from among multiple bootstrap eSIMs stored in a secure element of a mobile device. Specifically, the technique involves selecting the bootstrap eSIM based on location information associated with the mobile device. When the mobile device is located at a first location (for example, a first country) a first bootstrap eSIM associated with a Mobile Network Operator (MNO) local to the first country is selected. Similarly, when the mobile device is located at a second location (for example, a second country), a second bootstrap eSIM associated with an MNO local to the second country is selected.

18 Claims, 6 Drawing Sheets

(56) References Cited

U.S. PATENT DOCUMENTS

| | | | |
|---|---|---|---|
| 2012/0108207 A1* | 5/2012 | Schell | H04L 63/0853 455/411 |
| 2012/0260086 A1* | 10/2012 | Haggerty | H04W 4/003 713/150 |
| 2012/0322505 A1 | 12/2012 | Lodeweyckx | |
| 2013/0205390 A1 | 8/2013 | Hauck et al. | |
| 2013/0227646 A1* | 8/2013 | Haggerty | H04L 63/0853 726/3 |
| 2013/0303122 A1* | 11/2013 | Li | H04W 8/20 455/411 |
| 2014/0038601 A1* | 2/2014 | Gouriou | H04W 8/183 455/435.1 |
| 2014/0051423 A1* | 2/2014 | Marsden | H04W 4/001 455/419 |
| 2014/0134981 A1* | 5/2014 | Park | H04L 63/0853 455/411 |
| 2014/0349617 A1 | 11/2014 | Li et al. | |

\* cited by examiner

DEVICE AT FIRST LOCATION

DEVICE AT SECOND LOCATION

METHOD AND APPARATUS FOR SELECTING BOOTSTRAP ESIMS

CROSS-REFERENCE TO RELATED APPLICATIONS

This application claims the benefit of U.S. Provisional Patent Application No. 62/119,749, filed Feb. 23, 2015, entitled "Method and Apparatus for Selecting Bootstrap eSIMs," which is incorporated herein by reference in its entirety for all purposes.

FIELD

The described embodiments set forth a technique for selecting a particular bootstrap electronic Subscriber Identity Module (eSIM) from among a number of bootstrap eSIMs stored on a secure element included in a mobile device.

BACKGROUND

Most mobile devices are configured to utilize Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card (commonly referred to as a SIM card) that is configured to be inserted into a UICC-receiving bay included in a mobile device. In more recent implementations, however, UICCs are being embedded directly into system boards of mobile devices. An embedded UICC (eUICC) manages a number of electronic Subscriber Identity Modules (eSIMs) stored therein, thereby enabling a mobile device to communicate with a number of respective MNOs.

Currently, a "bootstrap" eSIM is pre-installed within the eUICC when the mobile device is shipped. The bootstrap eSIM is associated with a particular MNO and provides the mobile device with limited wireless access to the particular MNO's network for purposes of, for example, purchasing a data plan, mobile device unblocking, firmware updates, downloading eSIMs, etc. During manufacturing, a particular bootstrap eSIM is included in the eUICC based on a location (for example, USA, Europe, etc.) where the mobile device will be used. For instance, when the mobile device will be used in USA, a bootstrap eSIM associated with a local MNO (for example, AT&T) is included. Conversely, when the mobile device will be used in Europe, a bootstrap eSIM associated with a European MNO (for example, Deutsche Telekom) is included.

Notably, current eUICC implementations involve storing only one bootstrap eSIM in the eUICC. Consequently, increased costs can result when, for example, a user of a mobile device travels to another country and seeks to access wireless services provided in that country. Consider, for example, a user who purchases the mobile device in USA, where the mobile device comes preloaded with the bootstrap eSIM associated with a USA-based MNO. When the user uses the mobile device in a different location (for example, when the user travels to Europe), the USA-based MNO applies international rates for any transactions/operations (e.g., downloading a Europe-based eSIM) performed via the bootstrap eSIM. As the cost of international rates typically exceeds the cost of local rates, there is room for improvement with respect the foregoing approach.

SUMMARY

Representative embodiments set forth herein disclose various techniques for selecting a particular bootstrap electronic Subscriber Identity Module (eSIM) from among a number of bootstrap eSIMs stored on a secure element (for example, an eUICC) included in a mobile device. As described in greater detail herein, each bootstrap eSIM is pre-configured and associated with a particular Mobile Network Operator (MNO), and serves as a provisioning profile that can be used by the mobile device when attempting to, e.g., download a new eSIM. According to some embodiments, the secure element can include at least two bootstrap eSIMs, where a first bootstrap eSIM is associated with a local MNO (for example, AT&T), and a second bootstrap eSIM is associated with a foreign MNO (for example, Deutsche Telekom). The mobile device includes a selection agent that selects either the first or the second bootstrap eSIM based on various criteria (for example, location information associated with the mobile device, and/or other criteria) such that only one bootstrap eSIM is active/enabled at a time. For instance, when the mobile device is located in the USA, the first bootstrap eSIM is selected, and when the mobile device is located in Europe, the second bootstrap eSIM is selected. In this manner, an appropriate bootstrap eSIM that satisfies various criteria is selected. Also, because the second bootstrap eSIM is selected when the mobile device is located in Europe, international charges associated with the local MNO will be reduced, thereby significantly minimizing costs.

To select the particular bootstrap eSIM, the selection agent also utilizes information regarding: 1) a camping network to which the mobile device is connected, or camping networks available at a current location of the mobile device, 2) business agreements with MNOs, and 3) eSIMs installed on the secure element. In some embodiments, information about the business agreements is provided by a server communicably coupled to the mobile device. For instance, when a business agreement changes, the server can communicate the changes to the mobile device and the selection agent can be accordingly updated with the changes. The server can also provide various rules for eSIM selection and the selection agent utilizes the rules for selecting the particular bootstrap eSIM.

Some embodiments set forth a method for selecting a bootstrap electronic Subscriber Identity Module (eSIM) stored in a secure element included in a mobile device. The method includes the steps of (1) obtaining location information associated with the mobile device, (2) determining, based on the location information, a first bootstrap eSIM to be selected from among a plurality of bootstrap eSIMs stored in the secure element, (3) determining whether the first bootstrap eSIM is in an inactive state, and (4) when the first bootstrap eSIM is in the inactive state: (i) selecting the first bootstrap eSIM, and (ii) providing, to the secure element, a unique identifier associated with the first bootstrap eSIM.

Other embodiments set forth an alternative method for selecting a bootstrap electronic Subscriber Identity Module (eSIM). The method includes the steps of, by a selection agent of a mobile device, 1) obtaining location information identifying a current location of the mobile device, 2) identifying, based on the location information, a first bootstrap eSIM from among a plurality of bootstrap eSIMs stored in a secure element of the mobile device, 3) determining whether the first bootstrap eSIM is in an inactive state; and 4) when the first bootstrap eSIM is in the inactive state: (i) selecting the first bootstrap eSIM, and (ii) providing, to the secure element, a unique identifier associated with the first bootstrap eSIM.

In some embodiments, a method includes 5) implementing, by the secure element and a baseband component, an applet, and 6) providing, by the applet communicating with a Mobile Network Operator (MNO) and by the applet using the activated first bootstrap eSIM, a voice service or an internet service to the mobile device. In some embodiments, the method includes communicating with the MNO to perform one or more of: purchasing of a data plan, unblocking of the mobile device, updating of firmware on the mobile device or provisioning of a subscriber eSIM on the mobile device.

In some embodiments, a mobile device comprises a secure element configured to store a plurality of bootstrap electronic Subscriber Identity Modules (eSIMs), and a processor that causes the mobile device to: (1) obtain location information associated with the mobile device, (2) select a first bootstrap eSIM from among the plurality of bootstrap eSIMs based on the location information, (3) receive a request for a service, and (4) provide the requested service via the first bootstrap eSIM.

In some embodiments, a non-transitory computer readable storage medium is configured to store instructions that, when executed by a processor included in a mobile device, cause the mobile device to select a bootstrap electronic Subscriber Identity Module (eSIM) stored in a secure element included in the mobile device, by carrying out steps that include: (1) obtaining location information associated with the mobile device, (2) determining, based on the location information, a first bootstrap eSIM to be selected from among a plurality of bootstrap eSIMs stored in the secure element, and (3) selecting the first bootstrap eSIM when the first bootstrap eSIM is in an inactive state.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
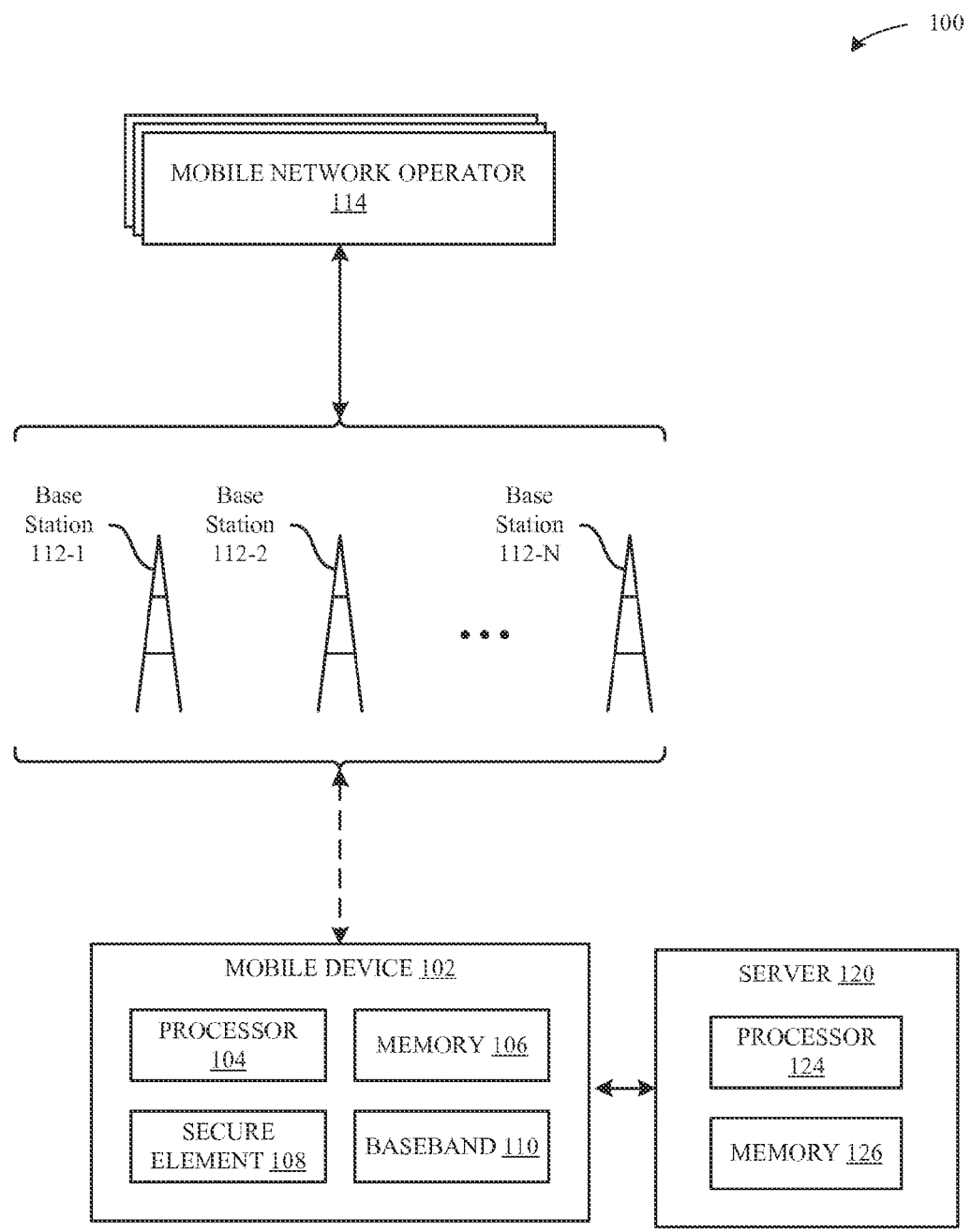
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Subscriber Identity Module data (SIM data) may be distributed using wired or wireless connections. This allows a user to download SIM data even if the user is traveling and does not have an account with a local carrier. In some embodiments, a bootstrapping SIM profile is SIM data that is associated with a temporary carrier—sometimes referred to as a provisioning carrier. As used here, the term "eSIM" can also be expressed as "SIM data," and "eSIM profile." In some embodiments, an eSIM profile includes an International Mobile Subscriber Identity (IMSI). In some embodiments, an eSIM profile includes a Temporary Mobile Subscriber Identity (TMSI). In some embodiments, an eSIM profile includes a Personal Unblocking Key (PUK) and/or a Personal Identification Number (PIN). In some embodiments, an eSIM profile includes a carrier key.

Typically, when a mobile device is being manufactured, a decision is made regarding which bootstrap electronic Subscriber Identity Module (eSIM) should be included in a secure element of the mobile device. For example, when the mobile device is going to be used in the USA, a first bootstrap eSIM associated with a local Mobile Network Operator (MNO) (e.g., AT&T) is included in the secure element. When the mobile device is going to be used in a foreign country, a second bootstrap eSIM associated with a foreign MNO (e.g., Deutsche Telekom) is included in the secure element. In other words, the secure element is loaded with only one bootstrap eSIM depending on a location where the mobile device is going to be used. As previously set forth herein, a bootstrap eSIM provides the mobile device with limited wireless access to the associated MNO's network for purposes of, for example, purchasing a data plan, mobile device unblocking, firmware updates, downloading eSIMs, and the like.

SIM data can be stored on the secure element. A provisioning service can load the desired SIM data onto the mobile device. The provisioning service may rely on operations provided by an MNO and a trusted service manager software application.

In some embodiments, the mobile device can roam onto a local carrier and attempt to download a subscriber eSIM. The local carrier can contact a provisioning carrier associated with a provisioning profile (of a bootstrap eSIM on the mobile device). When the provisioning carrier recognizes the user device (for example, when the bootstrap eSIM profile of the user device is registered with the provisioning carrier), the user device will be allowed to download a subscriber eSIM. The user device can then make a local call using the downloaded subscriber eSIM and avoid roaming charges.

Currently, when a mobile device that is loaded with the first bootstrap eSIM is used in the foreign country and a user of the mobile device requests a particular service (for example, a request to purchase a data plan), the particular service is performed via the first bootstrap eSIM associated with the local MNO. This results in an international charge being applied for the particular service. With a large number of users using their devices in different countries, costs associated with bootstrap eSIM usage increase significantly.

Accordingly, the embodiments set forth herein provide various techniques for selection of an appropriate bootstrap eSIM. To achieve these techniques, a number of bootstrap eSIMs—for example, a first bootstrap eSIM and a second bootstrap eSIM—associated with respective MNOs are pre-configured/pre-loaded in the secure element, and utilization of each of the bootstrap eSIMs corresponds to a current location of the mobile device. It is noted that, in some examples, bootstrap eSIMs can be "field-provisioned" into the secure element, such that the bootstrap eSIMs are not limited to being pre-configured/pre-loaded in the secure element. For example, when the mobile device is used in USA, the first bootstrap eSIM is selected, and when the mobile device is used in the foreign country, the second bootstrap eSIM is selected. In this scenario, when the mobile device is used in the foreign country and the user requests the particular service, the service is performed via the second bootstrap eSIM instead of the first bootstrap eSIM, thereby minimizing the costs by incurring local charges instead of international charges that would otherwise by incurred through usage of the first bootstrap eSIM.

According to some embodiments, a selection agent is included in a baseband component of the mobile device. The selection agent is configured to select the particular bootstrap eSIM based on various criteria. The criteria can include location information associated with the mobile device, camping network information, business related information, installed eSIM information, and the like. The location information identifies a current location of the mobile device, e.g., Global Positioning System (GPS) coordinates. The camping network information includes information regarding a camping network to which the mobile device is connected, or one or more camping networks that are accessible to the mobile device. The business related information includes information regarding various business agreements with MNOs. The installed eSIM information includes information regarding various eSIMs installed on the secure element.

When the selection agent identifies an appropriate bootstrap eSIM for selection, the selection agent provides, to the secure element, a unique identifier that corresponds to the selected bootstrap eSIM. In turn, the secure element activates the selected bootstrap eSIM. In some cases, the secure element deactivates a currently active bootstrap eSIM prior to activating the selected bootstrap eSIM. For instance, the mobile device can initially be used in a first location (e.g., USA) that causes the first bootstrap eSIM to be selected and activated. Thereafter, when the user of the mobile device travels to Europe, the selection agent can switch to the second bootstrap eSIM. In other words, a change in the location of the mobile device to a second location (e.g., Europe) causes: 1) the first bootstrap eSIM to be deactivated, and 2) the second bootstrap to be selected and activated.

Accordingly, the foregoing approaches provide techniques for selecting an appropriate bootstrap eSIM from among a number of bootstrap eSIMs to reduce costs associated with bootstrap eSIM usage. A more detailed discussion of these techniques is set forth below and described in conjunction with FIGS. 1-6, which illustrate detailed diagrams of systems and methods that can be used to implement these techniques.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11 ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102 and a group of base stations 112 that are managed by different MNOs 114. According the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include a processor 104, a memory 106, a secure element 108, and a baseband component 110. These components work in conjunction to enable the mobile device 102 to provide useful features to a user of the mobile device 102, such as localized computing, location based services, and Internet connectivity. The secure element can include a removable Universal Integrated Circuit Card (UICC) or an embedded UICC (eUICC). The mobile device 102 can communicate with a server 120. The server 120 can include a processor 124 and a memory 126.

In some embodiments, an eUICC can be a Hardware Security Module (HSM) (not shown). In some embodiments, an eUICC can include a network interface, a processor, a state database and and/or a memory. In some embodiments, an eUICC can verify eSIM-related requests to ensure that a given communication is received from an entity authorized to make eSIM-related requests. In some embodiments, an eUICC can be configured to self-destruct or permanently disable itself if tampered with.

As described in greater detail below, the secure element 108 can be configured to store multiple eSIMs for accessing the different MNOs 114 through the base stations 112. For example, the secure element 108 can be configured to store an eSIM for each MNO 114 to which mobile device 102 is subscribed. Each eSIM (also referred to herein as "subscriber eSIM") includes an International Mobile Subscriber Identity (IMSI) number that identifies a subscriber to the respective MNO's network and credentials used to authenticate the subscriber for purposes of granting access to the MNO network and its services. The secure element 108 can be further configured to store multiple bootstrap eSIMs associated with the different MNOs 114. Each bootstrap eSIM provides the mobile device with limited wireless access to an associated MNO's network for purposes of, for example, purchasing a data plan when traveling to a new location, device unblocking, firmware updates, downloading of other eSIMs, and the like.

Figure 2:
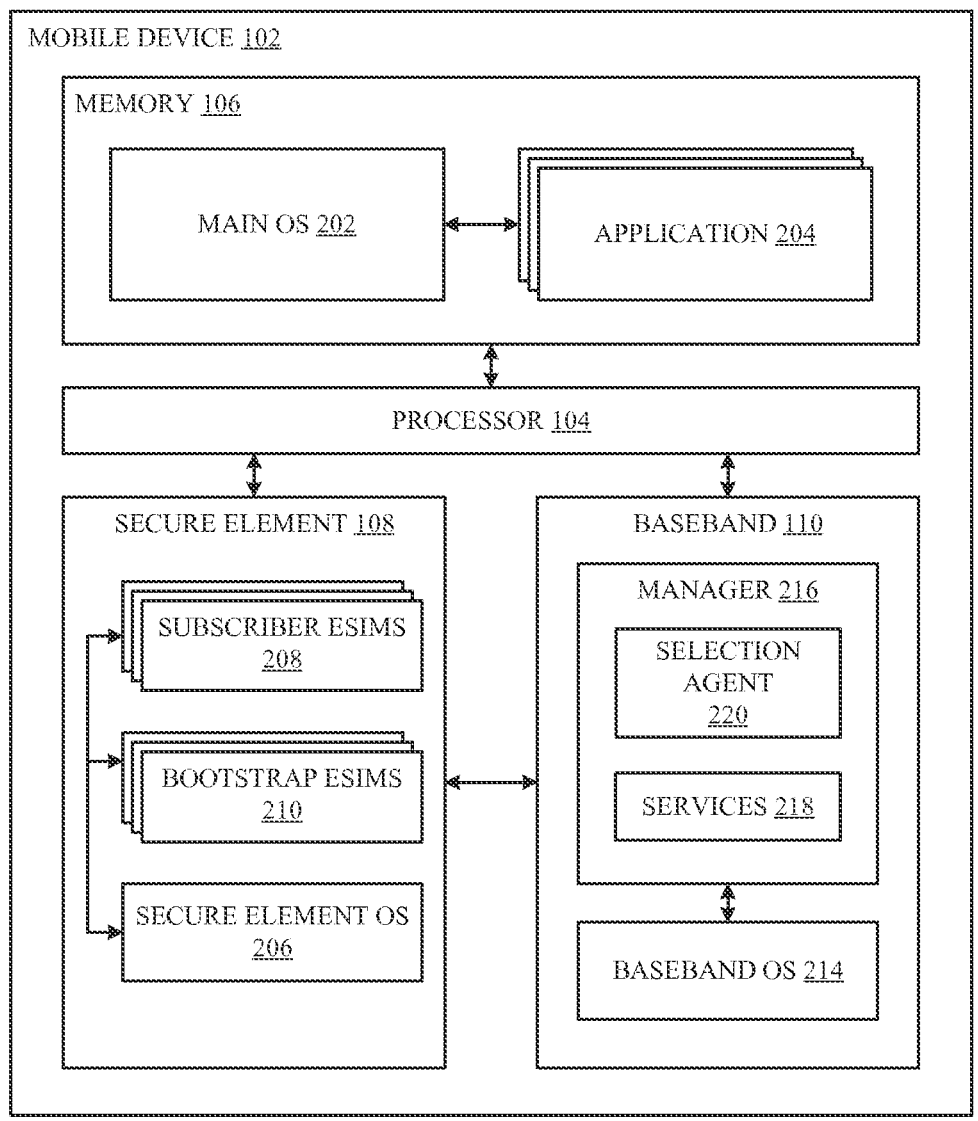
FIG. 2 illustrates a block diagram of a more detailed view of particular components of the system of FIG. 1, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the secure element 108 can be configured to implement a secure element OS 206 that is configured to manage the hardware resources of the secure element 108 (e.g., a processor and a memory). The secure element OS 206 can also be configured to manage subscriber eSIMs 208 and bootstrap eSIMs 210 that are stored by the secure element 108, e.g., by activating the subscriber eSIMs 208 and the bootstrap eSIMs 210 within the secure element 108 and providing the baseband component 110 with access to the subscriber eSIMs 208 and the bootstrap eSIMs 210. It will be appreciated that the size of the secure element 108 is sufficient to provision multiple subscriber eSIMs 208 and bootstrap eSIMs 210 in the secure element 108.

Although not illustrated in FIG. 2, each subscriber eSIM 208 can be associated with a unique identifier and can include multiple applets that define the manner in which the subscriber eSIM 208 operates. For example, one or more of the applets, when implemented by the baseband component 110 and the secure element 108, can be configured to enable the mobile device 102 to communicate with an MNO 114 and provide useful features (e.g., phone calls and internet) to a user of the mobile device 102. Similarly, each bootstrap eSIM 210 can be associated with a unique identifier and multiple applets that define the manner in which the bootstrap eSIM 210 operates. For example, one or more of the applets, when implemented by the baseband component 110 and the secure element 108, can be configured to provide the mobile device 102 with limited wireless access to an MNO 114 and allow certain operations/transactions (e.g., purchasing of a data plan, device unblocking, etc.) to be performed. In other words, the MNO 114 provides limited services to the mobile device 102 via the bootstrap eSIM 210.

As also shown in FIG. 2, the baseband component 110 of the mobile device 102 can include a baseband OS 214 that is configured to manage the hardware resources of the baseband component 110 (e.g., a processor, a memory, different radio components, etc.). According to some embodiments, the baseband component 110 can implement a manager 216 that is configured to interface with the secure element 108 to implement the various techniques described herein, which include exchanging installed eSIM information with the secure element OS 206 and selecting a particular bootstrap eSIM 210 when the secure element 108 stores multiple bootstrap eSIMs 210. The manager 216 can be configured to implement services 218, which represents a collection of software modules that are instantiated by way of the various applets of activated subscriber eSIMs 208/bootstrap eSIM 210 that are included in the secure element 108. For example, services 218 can be configured to manage the different connections that exist between the mobile device 102 and the MNOs 114 according to the different subscriber eSIMs 208/bootstrap eSIMs 210 that are activated.

As also shown in FIG. 2, the manager 216 includes a selection agent 220 that is configured to select a particular bootstrap eSIM 210 from among the multiple bootstrap eSIMs 210 stored within the secure element 108 based on various criteria. The selection agent 220 includes logic that drives the selection of the particular bootstrap eSIM 210. In some embodiments, the particular bootstrap eSIM 210 is selected based on location information associated with the mobile device 102. The location information identifies a current location of the mobile device. The mobile device 102/baseband component 110 can determine the current location using GPS (Global Positioning System). It will be appreciated that other techniques (such as, cellular triangulation, Wi-Fi triangulation, etc.) can be used to determine the current location of the mobile device.

Figure 3:
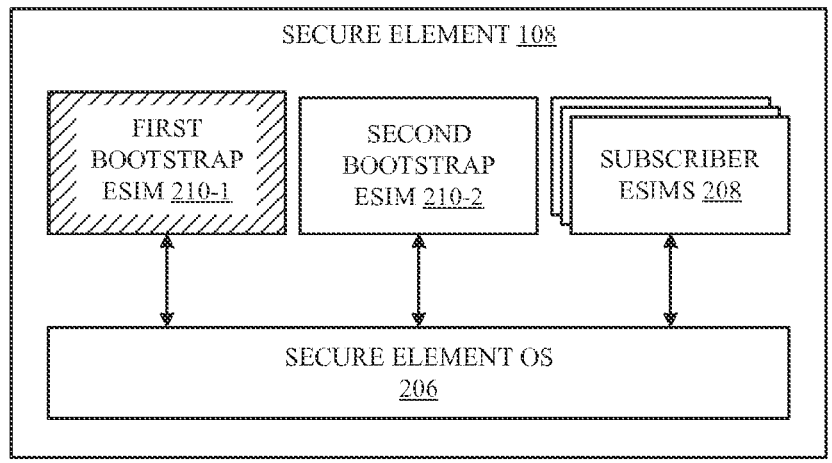
FIG. 3 illustrates conceptual diagrams depicting selection of a bootstrap eSIM by a selection agent of FIG. 2, according to some embodiments.
Figure 3:
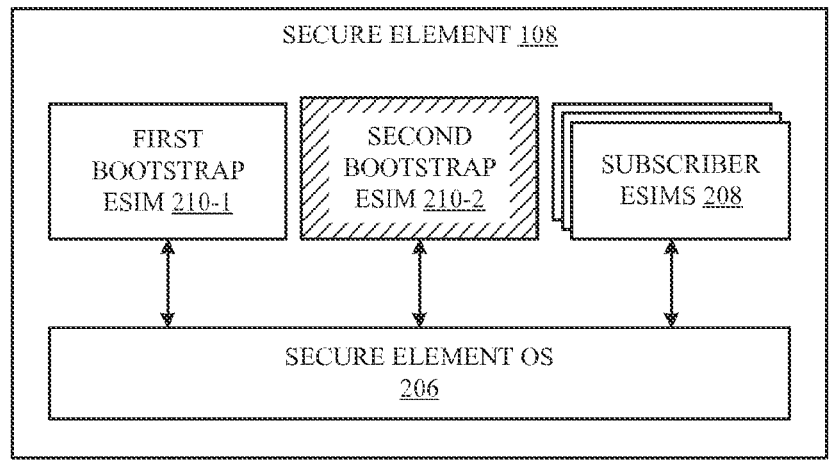

FIG. 3 illustrates conceptual diagrams depicting selection of the particular bootstrap eSIM 210 by the selection agent 220, according to some embodiments. As shown, either a first bootstrap eSIM 210-1 or a second bootstrap eSIM 210-2 is selected by the selection agent 220 based the location information associated with the mobile device 102. For instance, when the mobile device 102 is at a first location (for example, USA), the selection agent 220 selects the first bootstrap eSIM 210-1 that is associated with a local MNO 114 (such as, AT&T). When the mobile device 102 is at a second location (for example, a foreign country), the selection agent 220 selects the second bootstrap eSIM 210-2 that is associated with a foreign MNO 114 (i.e., an MNO that provides services in the foreign country).

Referring back to FIG. 2, the selection agent 220 can select the particular bootstrap eSIM 210 based on other criteria. The other criteria can be used individually or in conjunction with the location information to select the particular bootstrap eSIM 210. In some embodiments, the selection agent 220 can utilize camping network information for the selection of the particular bootstrap eSIM 210. The camping network information can include information regarding a camping network that the mobile device 102 is connected to or one or more camping networks available at a current location of the mobile device 102. Based on the camping network information, a determination can be made regarding a type of MNO (e.g., local or foreign) the mobile device 102 is connected to or is available at a current location of the mobile device 102. For instance, when the mobile device is connected to the local MNO, the first bootstrap eSIM 210-1 can be selected and when the mobile device is connected to the foreign MNO, the second bootstrap eSIM 210-2 can be selected.

In some embodiments, the camping network information can include an Operator controlled PLMN list (OPLMN), a Service Provider Name (SPN), and/or a PLMN Network Name (PNN).

In some embodiments, the selection agent 220 can utilize installed eSIM information for the selection of the particular bootstrap eSIM 210. The installed eSIM information can include a list of eSIMs (bootstrap eSIMs 210 and subscriber eSIMs 208) currently installed on the secure element 108. In one implementation, baseband component 110 can query the secure element OS 206 for the list of eSIMs currently installed on the secure element 108. The installed eSIM information includes an indication of whether a particular eSIM is a bootstrap eSIM 210 or a subscriber eSIM 208. The installed eSIM information can also include status information associated with the installed eSIMs. For example, the status information provides an indication regarding whether a particular bootstrap eSIM/subscriber eSIM is active or inactive. The selection agent 220 can utilize the installed eSIM information to identify the particular bootstrap eSIM 210 for selection.

In some embodiments, the selection agent 220 can utilize business related information for the selection of the particular bootstrap eSIM 210. The business related information can include information regarding business agreements with one or more MNOs 114, various business rules, and/or other information. The business related information can be provided to the mobile device 102 by a server 120 (as shown in FIG. 1) that is communicably coupled to the mobile device 102. The server 120 stores the business related information in memory 126 and a processor 124 provides the business related information to the mobile device 102 periodically or on-demand. In one implementation, the selection agent 220 can be modified/updated by the server 120. In other words, the logic that drives the selection of the particular bootstrap eSIM 210 can be downloaded and updated based on information from the server 120. For instance, when a business agreement with an MNO 114 changes (e.g., an existing agreement is canceled and/or a new agreement is instated), the server 120 can communicate the changes to the mobile device 102 and the selection agent 220 can be accordingly updated with the changes. In some embodiments, the server 120 pushes a message to the mobile device 102 to update the selection agent 220 based on the changes. In some embodiments, the mobile device 102 can poll the server 120 for the changes/updates to the selection agent 220. The selection agent 220 takes these changes into account when selecting the particular bootstrap eSIM 210. For example, the selection agent 220 does not select a bootstrap eSIM 210 associated with the MNO 114 with whom an existing agreement is canceled.

Business related information can include telephone service usage (for example, the total number of minutes used during each billing cycle) and data service usage (for example, the cost of connecting the mobile device to the Internet through an internet service provider).

In some implementations, the server 120 can also provide various business rules for eSIM selection (e.g., location based eSIM selection) and the selection agent 220 utilizes the rules for selecting the particular bootstrap eSIM 210. For instance, a business rule can include a rule to blacklist a particular MNO 114 associated with a bootstrap eSIM 210. In this case, the selection agent 220 does not select the bootstrap eSIM 210 associated with a blacklisted MNO 114.

In some embodiments, bootstrap eSIMs 210 stored in the secure element 108 can also be updated by the server 120. In some embodiments, the bootstrap eSIM 210 can be updated due to a network upgrade. In another embodiment, a bootstrap eSIM 210 associated with a particular MNO 114 can be replaced by another bootstrap eSIM 210 associated with another MNO 114. The replacing of bootstrap eSIMs can be performed as an atomic install-and-replace transaction, where one bootstrap eSIM 210 is replaced while another bootstrap eSIM 210 is installed (i.e., the two operations are performed together as one atomic transaction).

Referring back to FIG. 2, upon selection of the particular bootstrap eSIM 210, the selection agent 220 provides a unique identifier associated with the selected bootstrap eSIM 210 to the secure element OS 206. The secure element OS 206 activates the selected bootstrap eSIM 210, thereby providing the mobile device 102 with limited wireless access to the MNO 114 associated with the selected bootstrap eSIM 210.

In some embodiments, a manufacturer of the mobile device 102 maintains an account with a provisioning carrier. In this way, a selected bootstrap eSIM corresponds to an active account that can be used by the user of the mobile device 102. That is, the account allows the user of the mobile device 102 to provision mobile device 102 with a subscriber eSIM using the selected bootstrap eSIM. Preferably, a provisioning carrier has roaming agreements with multiple carriers so that the mobile device 102 can roam onto a local carrier in a wide variety of locations.

In some embodiments, a particular subscriber eSIM 208 can also be selected based on various factors. For example, when one subscriber eSIM 208 is out-of-service, the user of the mobile device 102 can be prompted to select a different subscriber eSIM 208. In some cases, where another subscriber eSIM cannot be selected, the mobile device 102 can fall back on a bootstrap eSIM 210 to allow the user to purchase another subscriber eSIM or use a bootstrap service to access the Internet (with payment).

Figure 4:
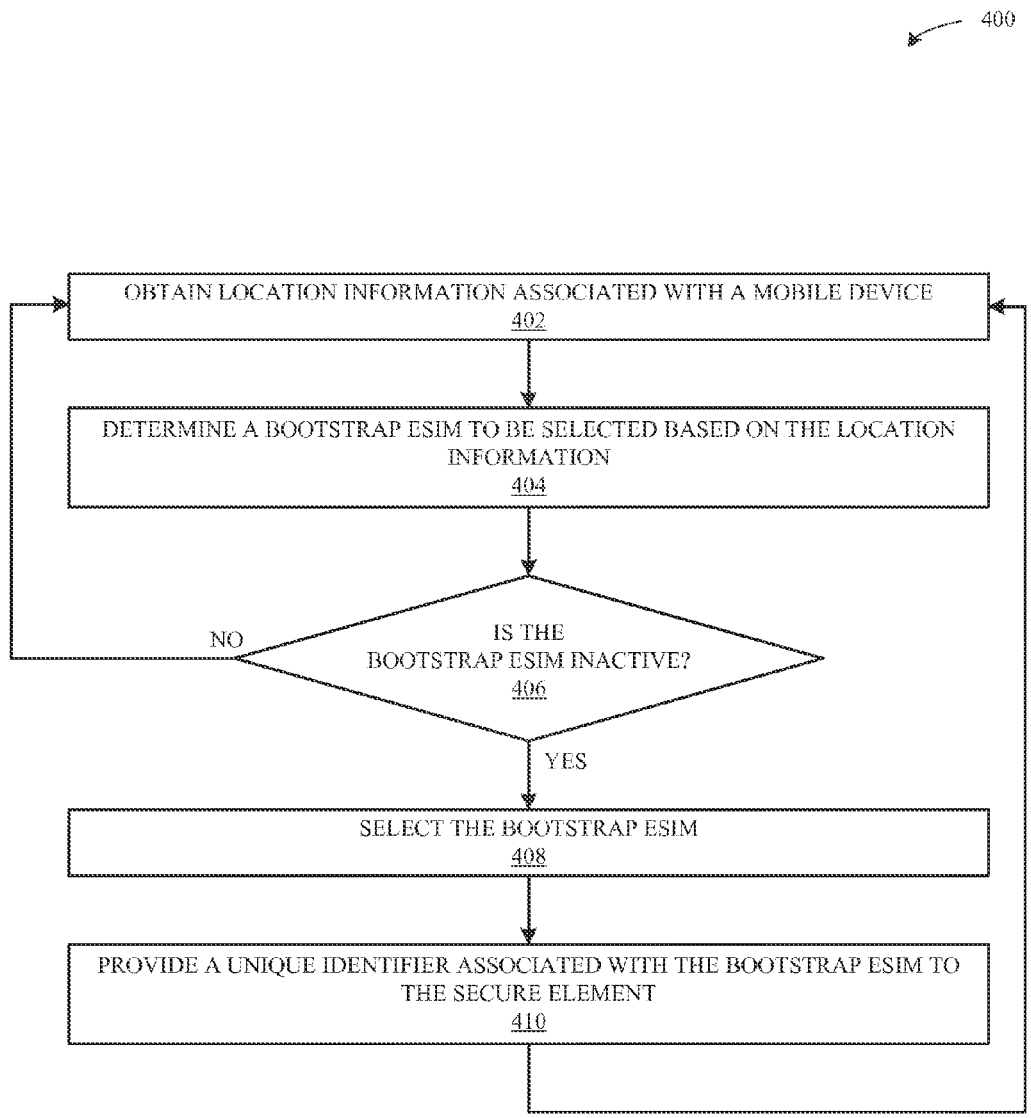
FIG. 4 illustrates a method that is carried out by a selection agent of a baseband component of the mobile device of FIG. 1, and involves interfacing with the secure element component of the mobile device of FIG. 1, according to some embodiments.

FIG. 4 illustrates a sequence diagram of a method 400 that is carried out by the selection agent 220, according to some embodiments. As shown, the method 400 begins at step 402, where the selection agent 220 obtains location information associated with the mobile device 102. In some embodiments, the baseband component 110 determines the current location of the mobile device 102 and provides the current location to the selection agent 220.

At step 404, the selection agent 220 determines a particular bootstrap eSIM to be selected based on the location information. At step 406, the selection agent 220 determines whether the particular bootstrap eSIM is inactive. When the particular bootstrap eSIM is inactive, the selection agent 220 selects the particular bootstrap eSIM, at step 408. For example, based on the location information, the selection agent 220 may determine that the second bootstrap eSIM 210-2 (as shown in FIG. 3) is to be selected because the mobile device 102 is at the second location.

In some embodiments, the selection agent 220 can utilize the installed eSIM information to determine whether the second bootstrap eSIM 210-2 is active or inactive. An eSIM is active when the eSIM is enabled to access services provided by a corresponding MNO 114. When the second bootstrap eSIM 210-2 is inactive (i.e., it is not enabled), the selection agent 220 selects the second bootstrap eSIM 210-2. In this scenario, it is possible that the current location of the mobile device 102 changed (for example, changed to the second location from a first location as shown in FIG. 3). Prior to the change in location, the first bootstrap eSIM 210-1 was active and the second bootstrap eSIM 210-2 was inactive. As a result of the change in location, the selection agent deselects the first bootstrap eSIM 210-1 and selects the second bootstrap eSIM 210-2 for activation. If, however, the location of the mobile device did not change (i.e., the mobile device was previously and is currently still located at the second location) and/or the second bootstrap eSIM is already active, the second bootstrap eSIM remains selected and updated location information is obtained at step 402.

At step 410, the selection agent 220 provides a unique identifier associated with the selected bootstrap eSIM 210 (for example, second bootstrap eSIM 210-2) to the secure element 108. In some embodiments, the selection agent 220 also provides a unique identifier associated with the deselected bootstrap eSIM 210 (for example, first bootstrap eSIM 210-1) to the secure element 108. The selection agent 220 can determine the unique identifier(s) from the installed eSIM information. The secure element OS 206 receives the unique identifier associated with the selected bootstrap eSIM 210 and activates the selected bootstrap eSIM 210. The secure element OS 206 deactivates the first bootstrap eSIM 210-1 (i.e., the currently active bootstrap eSIM) prior to activating the second bootstrap eSIM 210-2.

In some embodiments, at step 402, the selection agent 220 can also obtain other information (for example, camping network information, business related information, and/or installed eSIM information). And, at step 404, the selection agent 220 can determine the particular bootstrap eSIM 210 to be selected based on the location information and/or the other information. For example, the selection agent 220 can determine that the second bootstrap eSIM 210-2 is to be selected because the camping network information indicates that the mobile device 102 is connected to a camping network associated with a foreign MNO 114. Also, the selection agent 220 can determine that the second bootstrap eSIM 210-2 is to be selected because the business related information indicates that a business agreement exists with the corresponding MNO 114. Moreover, in a case where, for example, 1) two bootstrap eSIMs 210 associated with two foreign MNOs 114 are loaded onto the secure element 108, 2) either of the two bootstrap eSIMs 210 can be selected based on the location/camping network information because the two foreign MNOs 114 provide services in the same country, and 3) business related information indicates that no business agreement exists with one of the two MNOs 114, the bootstrap eSIM 210 with whom the business agreement exists can be selected by the selection agent 220. In this manner, the selection agent 220 can utilize various criteria/information to determine which particular bootstrap eSIM 210 to select from among the multiple bootstrap eSIMs 210 provided in the secure element 108.

Also, at step 402, updated location information for the mobile device 102 can be obtained and steps 404-410 can be performed with the updated location information. For instance, the updated location information may indicate an updated location (in cases where the current location of the mobile device has changed from a previous location) and the selection agent 220 can determine a different bootstrap eSIM 210 to be selected based on the updated location information.

Figure 5:
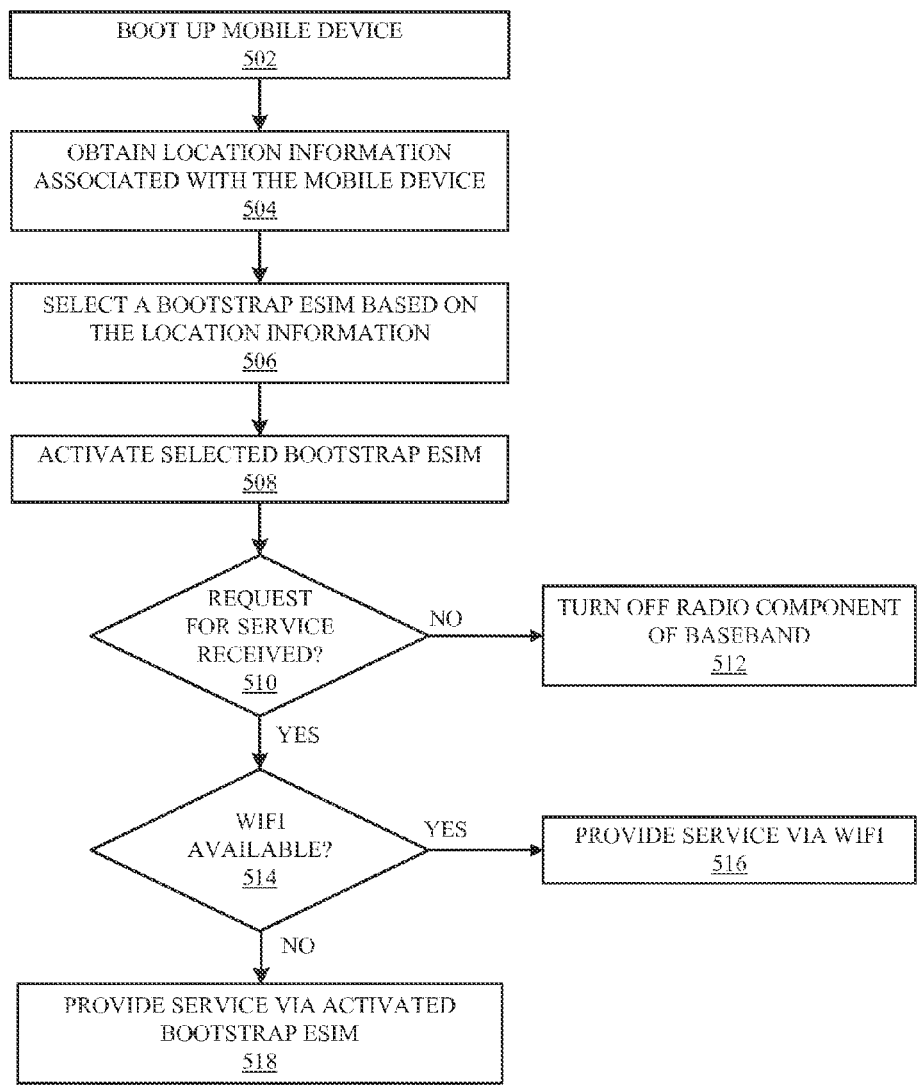
FIG. 5 illustrates a method that is carried out by the mobile device of FIG. 1, and involves interfacing with the secure element component and baseband component, according to some embodiments.

FIG. 5 illustrates a sequence diagram of a method 500 that is carried out by the mobile device 102, according to some embodiments. As shown, the method 500 begins at step 502, where the mobile device 102 is booted up. At step 504, upon boot up, location information associated with the mobile device is obtained (for example, via radio component or GPS component of baseband component 110, for example). At step 506, a particular bootstrap eSIM 210 from among a number of bootstrap eSIMs 210 in the secure element 108 is selected based on the location information. In some embodiments, step 506 can be performed by baseband component 110, in particular, the selection agent 220 of baseband component 110 in a manner described with respect to FIG. 4. At step 508, the selected bootstrap eSIM 210 is activated (by secure element 108, for example).

At step 510, a determination is made regarding whether a request for a service (such as, purchase of a data plan) is received. When no request is received, radio components of the baseband component 110 are turned off (at step 512). The mobile device 102 thus becomes a Wi-Fi only device (if a Wi-Fi connection is available) and the activated bootstrap eSIM is not used. When the request is received, a determination is made regarding whether a Wi-Fi connection is available, at step 514. When the Wi-Fi connection is available, the requested service is provided via the Wi-Fi connection, at step 516. On the other hand, when the Wi-Fi connection is not available, the requested service is provided via the activated bootstrap eSIM 210, at step 518. For example, the user of the mobile device 102 is allowed to purchase a data plan via the activated bootstrap eSIM 210. Thus, when the mobile device 102 does not have wireless connectivity, the activated bootstrap eSIM 210 is used to provide the mobile device 102 with limited access to an associated MNO 114 for purposes of performing a limited number of operations. Moreover, the user of the mobile device is not aware of which bootstrap eSIM 210 is being used to provide the service (i.e., switching to or between bootstrap eSIMs is transparent to the user).

While various embodiments have been described for the selection agent 220 included in baseband component 110 as shown in FIG. 2, it will be appreciated that the embodiments described herein can be used regardless of where the selection agent 220 is provided in the mobile device 102. For example, the selection agent can be coupled to the processor 104 or included in the secure element 108, without departing from the scope of this disclosure.

Figure 6:
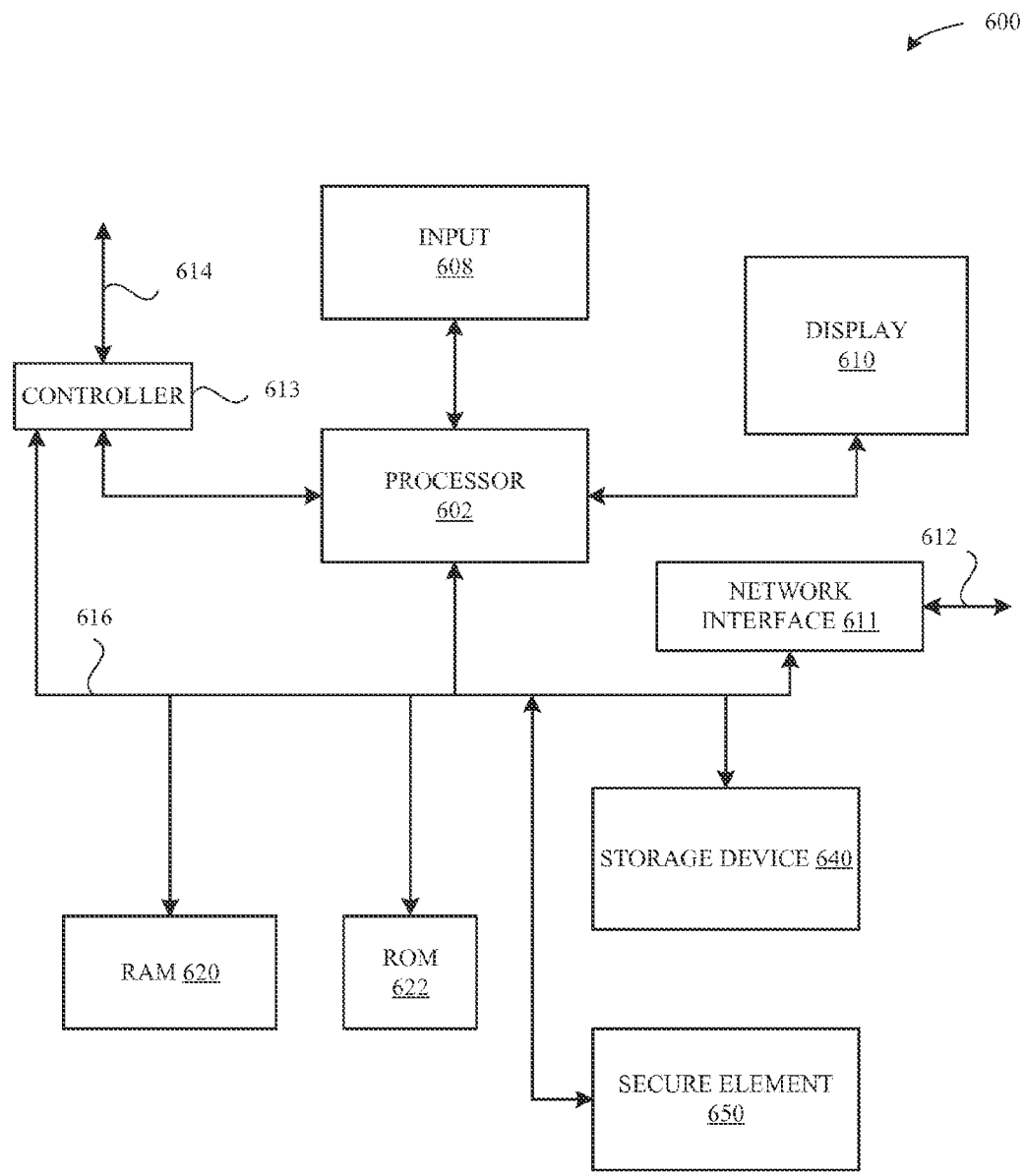
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the mobile device 102 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 can further include a secure element 650, which can represent the secure element 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
by a mobile device:
   obtaining location information identifying a current location of the mobile device;
   selecting, based on the location information, a selected bootstrap electronic subscriber identity module (eSIM) from among a plurality of installed bootstrap eSIMs in a secure element of the mobile device;
   activating the selected bootstrap eSIM; and
   communicating, using the selected bootstrap eSIM, with a mobile network operator (MNO), wherein the communicating with the MNO comprises replacing a first bootstrap eSIM of the plurality of installed bootstrap eSIMs by installing a second bootstrap eSIM, wherein the selected, first and second bootstrap eSIMs enable limited wireless access for purposes of purchasing a data plan, mobile device unblocking, firmware updates, and/or downloading eSIMs.

2. The method of claim 1, wherein the communicating with the MNO comprises: performing provisioning of a subscriber eSIM on the mobile device; and providing voice or data service to a user of the mobile device.

3. The method of claim 1, further comprising:
obtaining camping network information associated with the mobile device, and wherein selecting comprises selecting, based on the camping network information and the location information, the first bootstrap eSIM.

4. The method of claim 1, further comprising:
obtaining business agreement information, wherein the business agreement information comprises information regarding one or more business agreements with one or more MNOs; and
determining, based on the business agreement information and the location information, the selected bootstrap eSIM.

5. A mobile device, comprising:
a memory;
a secure element configured to store a plurality of installed bootstrap electronic Subscriber Identity Modules (eSIMs); and
a processor, wherein the memory includes instructions that, when executed by the processor, cause the mobile device to:
   obtain location information associated with the mobile device,
   select a selected bootstrap eSIM from among the plurality of installed bootstrap eSIMs based on the location information,
   activate the selected bootstrap eSIM,
   communicate, using the selected bootstrap eSIM, with a mobile network operator (MNO), and
   replace a first bootstrap eSIM of the plurality of installed bootstrap eSIMs by installing a second bootstrap eSIM, wherein the selected, first and second bootstrap eSIMs enable limited wireless access for purposes of purchasing a data plan, mobile device unblocking, firmware updates, and/or downloading eSIMs.

6. A non-transitory computer readable storage medium configured to store instructions that, when executed by a processor included in a mobile device, cause the mobile device to select a bootstrap electronic Subscriber Identity Module (eSIM) stored in a secure element included in the mobile device, by carrying out steps that include:

obtaining location information associated with the mobile device;

selecting, based on the location information, a selected bootstrap eSIM from among a plurality of installed bootstrap eSIMs stored in the secure element;

activating the selected bootstrap eSIM;

communicating, using the selected bootstrap eSIM, with a mobile network operator (MNO); and replacing a first bootstrap eSIM of the plurality of installed bootstrap eSIMs by installing a second bootstrap eSIM, wherein the selected, first and second bootstrap eSIMs enable limited wireless access for purposes of purchasing a data plan, mobile device unblocking, firmware updates, and/or downloading eSIMs.

7. The non-transitory computer readable storage medium of claim 6, wherein the steps further include:

obtaining camping network information, and wherein the selecting further comprises selecting, based on the camping network information and the location information, the first bootstrap eSIM from among the plurality of bootstrap eSIMs stored in the secure element.

8. The method of claim 1, wherein the communicating with the MNO comprises performing purchasing of a data plan.

9. The method of claim 1, wherein the communicating with the MNO comprises performing unblocking of the mobile device.

10. The method of claim 1, wherein the communicating with the MNO comprises performing a firmware update of the mobile device.

11. The method of claim 1, further comprising:

before the selecting: querying the secure element for a list of bootstrap eSIMs and subscriber eSIMs installed in the secure element, wherein the selecting further comprises selecting the selected bootstrap eSIM based on the list.

12. The method of claim 1, further comprising:

before the selecting: receiving, from a server, an update message, wherein the selecting further comprises selecting the selected bootstrap eSIM based on the update message.

13. The mobile device of claim 5, wherein the instructions further cause the mobile device to perform purchasing of a data plan.

14. The mobile device of claim 5, wherein the instructions further cause the mobile device to perform unblocking of the mobile device.

15. The mobile device of claim 5, wherein the instructions further cause the mobile device to perform a firmware update of the mobile device.

16. The non-transitory computer readable storage medium of claim 6, wherein the steps further include purchasing of a data plan.

17. The non-transitory computer readable storage medium of claim 6, wherein the steps further include unblocking of the mobile device.

18. The non-transitory computer readable storage medium of claim 6, wherein the steps further include performing a firmware update of the mobile device.

* * * * *